Aug. 27, 1940.  J. A. GUFFRA  2,212,734
WHEEL FLANGE OILER
Filed Sept. 5, 1939

INVENTOR
JOSEPH A. GUFFRA
BY Boyken & Mohler
ATTORNEY

Patented Aug. 27, 1940

2,212,734

UNITED STATES PATENT OFFICE 2,212,734

WHEEL FLANGE OILER

Joseph A. Guffra, Portola, Calif.

Application September 5, 1939, Serial No. 293,323

7 Claims. (Cl. 184—3)

This invention relates to a wheel flange oiler particularly adapted for use in applying oil to the flange of a locomotive wheel, and has for one of its objects improved means for more efficiently oiling the flanges of such wheels than heretofore. Another object is the provision of improved means for more economically depositing oil on the flange of a locomotive wheel than heretofore and distributing such oil over the flange while substantially preventing the oil from passing to the tread of the wheel in an objectionable amount.

Other objects and advantages will appear in the specification and claims annexed hereto.

In the drawing, Fig. 1 is a reduced size elevational view of my device in position on the flange of a wheel, as seen from the outer side of such wheel.

Figure 1:
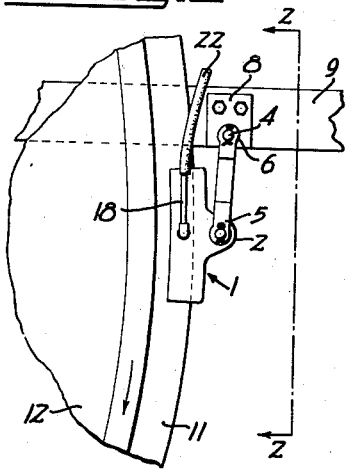
Figure 2:
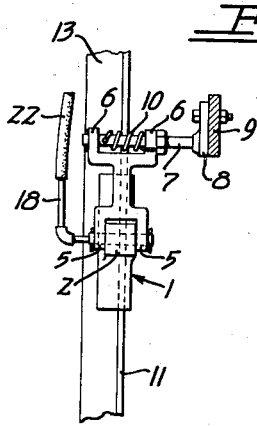
Fig. 2 is a view of my device as seen from line 2—2 of Fig. 1.

In detail, referring to Figs. 1, 2, the flange fitting shoe of my device is indicated generally at 1, which shoe is formed with a lug 2 projecting from one side, said lug being bored through at 3 (Fig. 4) to pass a mounting bolt 4 therethrough and through corresponding openings in the ends of the arms 5 of a yoke, which arms receive the lug 2 therebetween. The yoke is likewise bifurcated to form arms 6 at the end opposite the arms 5, said arms being formed at their outer ends with aligned openings adapted to rorotatably pass a shaft 7 projecting from a bracket 8 adapted to be bolted to any suitable portion of frame 9 of the locomotive. Between arms 6 is a torsion spring 10 surrounding shaft 7 adapted to yieldably force shoe 1 against the flange 11 of the wheel 12, the tread of said wheel being indicated at one side of the flange at 13, (Fig. 2).

Figure 3:
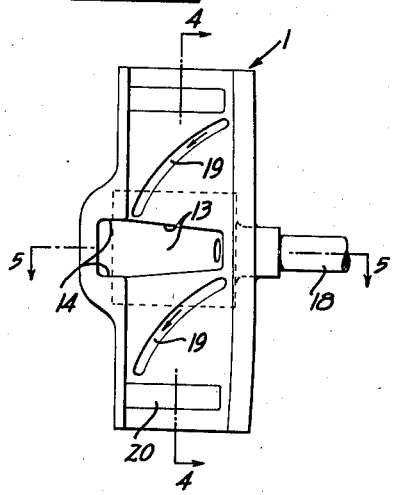
Fig. 3 is an elevational view of the flange fitting shoe of my device as seen from the side adapted to receive the wheel flange.
Figure 4:
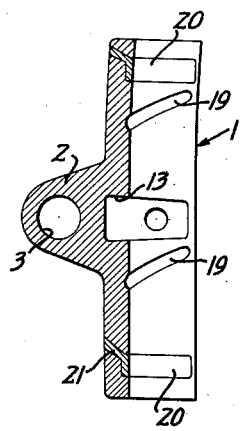
Fig. 4 is a sectional view taken along the line 4—4 of Fig. 3.
Figure 5:
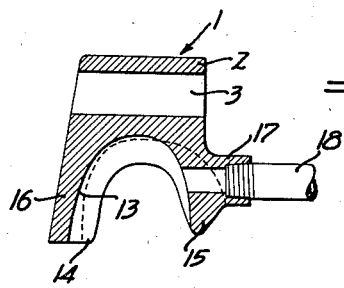
Fig. 5 is a sectional view taken along the line 5—5 of Fig. 3.

Referring more specifically to Figs. 3 to 5, it is seen that the shoe 1 is elongated in direction and is channel shaped on its side opposite the lug 2, the said channel extending longitudinally of the shoe. The said channel is slightly curved longitudinally to correspond to the peripheral curvature of the flange 11 of the wheel, and said channel is shaped transversely of its length to substantially correspond to the cross-sectional shape of the wheel flange. Thus the flange of the wheel fits in said channel.

Centrally between the ends of the channel is a groove 13 extending transversely of the length of said channel, which groove is relatively shallow and narrow at one end and gradually becomes deeper and wider as it goes around the sides of the channel, and opens outwardly at its opposite end, as at 14, in direction extending away from the bottom of the channel. The side 15 of the channel is the side that is adjacent the tread of wheel and the opposite side 16 is the side on the inside of the wheel. The open end 14 of groove 13 is at the inside of the wheel and the shallow, narrow end of the groove is on the side of the channel adjacent the tread, or on the outer side of the wheel.

The side 15 of said channel is formed with an outwardly projecting boss 17 directly opposite the shallow end of groove 13, which boss is centrally formed with a through bore and is threaded to receive the end of an oil and steam pipe 18. While I refer to this pipe 18 as an oil and steam pipe, air may be used instead of steam, and said pipe extends to a source of oil and steam for conducting the oil, under the force of the air or steam to the shoe and into the shallow end of groove 13, where the oil will be blown against the tread side of the flange 11 of the locomotive wheel. The steam or air will, of course, pass around the groove 13 and out of the open end 14 on the side opposite the tread 13 of the wheel. The oil, of course, will impinge against the flange of the wheel that is adjacent the rail on which the wheel runs, thus properly lubricating the flange and reducing the wear on the flange and rail.

The inner side of the channel in shoe 1 is also formed with oil grooves 19, which grooves are at opposite sides of groove 13 and obliquely across the channel. These grooves function to carry any surplus oil on the wheel flange in the direction of the arrows away from the tread of the wheel, and to the side of the channel opposite the tread, so as to prevent an objectionable amount of oil from passing onto the tread. Also, inner sides of the channel at opposite ends of the shoe are formed with grooves that extend transversely of the length of said channel, which grooves are filled with babbitt 20 through openings 21, when the shoe is fitted against the wheel. Thus, in the event of worn or misshapen flanges, the shoe will nevertheless have a snug fit.

The pipe 18 may be connected by a flexible line 22 (Figs. 1, 2) with a steam and oil control means as disclosed in my United States Letters Patent No. 2,106,924, dated February 1, 1938.

From the foregoing description, it is seen that my improved oil applying device will direct the oil on the desired area of the wheel flange without waste, and such oil will not pass onto the tread in an objectionable amount. The shoe will always be held tight against the flange, and the steam or air that conducts the oil to the flange will be ejected on the side of the flange opposite the wheel, where any oil not deposited on the flange, but carried over the latter, will not be distributed onto the tread.

Having described my invention, I claim:

1. A device of the character described comprising a shoe formed to slidably fit against the side of the flange of a locomotive wheel that is adjacent the tread of said wheel, means for supporting said shoe against such flange against rotation with the wheel, a passageway in said shoe provided with an outlet opening directed toward said flange when the shoe is in position thereagainst, means for supplying oil to said passageway for discharge from said outlet opening and means on the shoe for causing oil deposited on said flange to flow in a direction away from the tread of the wheel when the wheel is rotated.

2. In a construction as defined in claim 1, said last mentioned means comprising grooves formed in the side of said shoe adapted to engage the flange of the wheel.

3. In a construction as defined in claim 2, said shoe being elongated in a direction circumferentially of the flange adapted to be engaged thereby, and the means for supplying oil to said passageway comprising an oil line adapted to conduct steam under pressure with oil entrained therein to said passageway and a groove formed in the side of said shoe against which the wheel flange is adapted to fit communicating at one end with said outlet and opening outwardly of the shoe at the opposite end for exhausting the steam that carries the oil to the flange.

4. A device of the character described comprising a shoe formed with a channel adapted to fit over the flange of a locomotive wheel including the side thereof adjacent the tread of the wheel, means for supporting said shoe on said flange, means for depositing oil against that portion of the tread side of the flange adapted to fit in said channel including a passageway for oil in said shoe provided with an outlet opening on the side of the channel adapted to fit against the side of the wheel flange adjacent the tread of such wheel, a source of elastic fluid means for conducting oil and such elastic fluid, under pressure, to said passageway for discharge from said opening, and means for conducting the fluid ejected from said opening away from the tread side of said flange comprising a groove in said channel extending transversely of the length thereof from said opening to the opposite side of said channel, whereby such fluid will pass transversely over the peripheral edge of the flange of the wheel adapted to fit in said channel, said opening being positioned at one end of said groove.

5. In a construction as defined in claim 4, said groove being of progressively increased depth in direction extending away from said opening, and the end of the groove opposite said opening extending through the edge of the channel along the side thereof opposite the side having said opening whereby the fluid in said groove is free to escape at said edge.

6. A device of the character described comprising an elongated metal shoe formed with a channel in one side extending longitudinally of said shoe, the sides and bottom of said channel being formed to substantially correspond to the circumferential curvature and cross-sectional contour of the flange of a locomotive wheel for receiving such flange therein, a passageway formed in said shoe provided with an outlet opening on the side of said channel adapted to fit against the side of the wheel flange adjacent the tread of such wheel, an oil and steam pressure line connecting with said passageway for conducting oil and steam to said passageway for discharge through said outlet and against said wheel flange, the inner side of said channel being formed with a groove extending from said outlet across the bottom of the channel and across the side opposite said outlet for conducting steam discharged from said outlet to the side of the channel opposite said outlet when the wheel flange is in said channel, and an oil groove formed in the inner side of said channel at one side of the first mentioned groove for collecting excess oil discharged from said outlet.

7. In a construction as defined in claim 6, means at opposite ends of said shoe extending transversely across the inner side of said channel comprising a relatively soft and relatively fusible metal as compared with the metal of said shoe adapted to slidably fit against the sides and peripheral edge of the wheel flange adapted to fit in said channel.

JOSEPH A. GUFFRA.